US012235715B2

(12) United States Patent
Kumar et al.

(10) Patent No.: US 12,235,715 B2
(45) Date of Patent: *Feb. 25, 2025

(54) SYSTEM FOR EARLY DETECTION OF OPERATIONAL FAILURE IN COMPONENT-LEVEL FUNCTIONS WITHIN A COMPUTING ENVIRONMENT

(71) Applicant: BANK OF AMERICA CORPORATION, Charlotte, NC (US)

(72) Inventors: Ashok Kumar, Hyderabad (IN); Narsing Raj, Hyderabad (IN); Venkata Lakshmi Sai Siva Kumar Devulapalli, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,740

(22) Filed: Jan. 10, 2024

(65) Prior Publication Data

US 2024/0143426 A1 May 2, 2024

Related U.S. Application Data

(63) Continuation of application No. 17/708,167, filed on Mar. 30, 2022, now Pat. No. 11,914,457.

(51) Int. Cl.
*G06F 11/00* (2006.01)
*G06F 11/07* (2006.01)

(52) U.S. Cl.
CPC ...... *G06F 11/0751* (2013.01); *G06F 11/0721* (2013.01); *G06F 11/0787* (2013.01)

(58) Field of Classification Search
CPC ............ G06F 11/0751; G06F 11/0721; G06F 11/0787
USPC ....................................... 714/1–57
See application file for complete search history.

(56) References Cited

U.S. PATENT DOCUMENTS

| | | | |
|---|---|---|---|
| 6,055,362 A * | 4/2000 | Kesner | G06F 1/12 714/1 |
| 7,457,991 B1 * | 11/2008 | Teague | G06F 11/2242 714/47.1 |
| 9,158,650 B2 | 10/2015 | Akirekadu et al. | |
| 9,374,417 B1 | 6/2016 | Greenfield et al. | |

(Continued)

*Primary Examiner* — Sarai E Butler
(74) *Attorney, Agent, or Firm* — Moore & Van Allen PLLC; Anup Iyer (57) ABSTRACT

Systems, computer program products, and methods are described herein for early detection of operational failure in component-level functions within a computing environment. The present invention is configured to receive, from one or more source devices, log data; determine, using a trained machine learning model, a likelihood that a first subset of the log data is associated with an operational failure of one or more component-level functions; determine that the likelihood that the first subset of the log data is associated with the operational failure of one or more component-level functions is greater than a predetermined threshold; determine that the first subset of the log data reflects a current state of a first subset of source devices; generate a notification indicating that the first subset of source devices is likely to experience the operational failure of one or more component-level functions; and display the notification on an administrator device associated with the first subset of source devices.

20 Claims, 3 Drawing Sheets

(56) References Cited

U.S. PATENT DOCUMENTS

| | | | |
|---|---|---|---|
| 9,413,818 B2 | 8/2016 | Abuelsaad et al. | |
| 9,569,433 B1 | 2/2017 | Gill et al. | |
| 9,712,410 B1 | 7/2017 | Char et al. | |
| 9,811,443 B2 | 11/2017 | Doi et al. | |
| 9,876,703 B1 | 1/2018 | Arllen et al. | |
| 10,158,541 B2 | 12/2018 | Carmel et al. | |
| 10,241,882 B2 | 3/2019 | Avery et al. | |
| 10,452,463 B2 | 10/2019 | Hiran et al. | |
| 10,536,505 B2 | 1/2020 | Pasupuleti | |
| 10,613,962 B1* | 4/2020 | Delange | G06F 11/3006 |
| 10,644,947 B2 | 5/2020 | Goel et al. | |
| 10,785,320 B2 | 9/2020 | Pai et al. | |
| 10,885,565 B1 | 1/2021 | Russell et al. | |
| 11,314,574 B2 | 4/2022 | Handa et al. | |
| 2002/0087612 A1* | 7/2002 | Harper | G06F 9/4856 |
| | | | 718/100 |
| 2003/0004679 A1* | 1/2003 | Tryon, III | H04L 41/5032 |
| | | | 702/182 |
| 2005/0246590 A1* | 11/2005 | Lancaster | G06F 11/0781 |
| | | | 714/47.2 |
| 2011/0202802 A1* | 8/2011 | Gotoh | H04L 41/0604 |
| | | | 714/45 |
| 2012/0117227 A1 | 5/2012 | Lam et al. | |
| 2012/0143677 A1 | 6/2012 | Bruno et al. | |
| 2013/0007265 A1 | 1/2013 | Benedetti et al. | |
| 2015/0222505 A1 | 8/2015 | Zmievski et al. | |
| 2016/0373313 A1 | 12/2016 | Giri et al. | |
| 2017/0091007 A1* | 3/2017 | Dasari | G06F 11/0751 |
| 2018/0081501 A1* | 3/2018 | Johnston | H04L 67/025 |
| 2019/0235943 A1* | 8/2019 | Gordani | G06F 11/0793 |
| 2020/0310934 A1* | 10/2020 | Shibata | G06F 11/0778 |
| 2021/0351978 A1 | 11/2021 | Dhawan et al. | |
| 2022/0138061 A1 | 5/2022 | Beuch et al. | |

* cited by examiner

SYSTEM FOR EARLY DETECTION OF OPERATIONAL FAILURE IN COMPONENT-LEVEL FUNCTIONS WITHIN A COMPUTING ENVIRONMENT

CROSS-REFERENCE TO RELATED APPLICATION

This application is a continuation application of and claims priority to U.S. patent application Ser. No. 17/708,167 of the same title and filed on Mar. 30, 2022; the contents of which are also incorporated herein by reference.

FIELD OF THE INVENTION

The present invention embraces a system for early detection of operational failure in component-level functions within a computing environment.

BACKGROUND

Application performance management (APM) is the monitoring and management of performance and availability of devices and applications by diagnosing complex application performance problems to maintain an expected level of service. Operational elements of a computing environment are becoming increasingly difficult to manage as they move toward highly distributed, multi-tier, multi-element constructs. Any operational failure detection and mitigation in services, processes, hosts, logs, networks, and/or the like, often involves manual intervention which can become a tedious process. Therefore, there is a need for an intelligent system for early detection of operational failure in component-level functions within a computing environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for early detection of operational failure in component-level functions within a computing environment is presented. The system comprising: at least one non-transitory storage device; and at least one processor coupled to the at least one non-transitory storage device, wherein the at least one processor is configured to: electronically receive, from one or more source devices, log data; analyze, using a machine learning subsystem, the log data for indications of operational failure of one or more component-level functions associated with the one or more source devices, wherein analyzing further comprises: determining, using a trained machine learning model, a likelihood that a first subset of the log data is associated with operational failure of one or more component-level functions; determining that the likelihood that the first subset of the log data is associated with the operational failure of one or more component-level functions is greater than a predetermined threshold; determine that the first subset of the log data reflects a current state of a first subset of source devices; generate a notification indicating that the first subset of source devices is likely to experience the operational failure of one or more component-level functions; and transmit control signals configured to cause an administrator device associated with the first subset of source devices to display the notification.

In some embodiments, the at least one processor is further configured to: retrieve, from a first internal repository, one or more mitigation actions associated with the operational failure of one or more component-level functions; and transmit control signals configured to cause the administrator device to display the one or more mitigation actions.

In some embodiments, the one or more mitigation actions are preventative actions that are to be implemented before the first subset of source devices experience the operational failure of one or more component-level functions.

In some embodiments, the one or more mitigation actions are remedial actions that are to be implemented after the first subset of source devices experience the operational failure of one or more component-level functions.

In some embodiments, the at least one processor is further configured to: continuously monitor component-level functions of one or more source devices within the computing environment; determine a current state of the one or more source devices based on at least monitoring the component-level functions of the one or more source devices; and electronically receive, from one or more source devices, the log data reflecting the current state of the one or more source devices.

In some embodiments, the at least one processor is further configured to: continuously monitor incidences of historical component-level functional failures associated with the one or more source devices; retrieve historical log data corresponding to the historical component-level functional failures, wherein the historical log data reflects a state of the one or more source devices a predetermined period of time prior to the incidences of the historical component-level functional failures; and store the historical log data and the corresponding historical component-level functional failures in a second internal repository.

In some embodiments, the at least one processor is further configured to: retrieve, from the second internal repository, the historical log data and the corresponding historical component-level functional failures; and generate a training dataset using the historical log data and the corresponding historical component-level functional failures.

In some embodiments, the at least one processor is further configured to: train a machine learning model with the training dataset using a machine learning algorithm; and generate the trained machine learning model.

In another aspect, a computer program product for early detection of operational failure in component-level functions within a computing environment is presented. The computer program product comprising a non-transitory computer-readable medium comprising code causing a first apparatus to: electronically receive, from one or more source devices, log data; analyze, using a machine learning subsystem, the log data for indications of operational failure of one or more component-level functions associated with the one or more source devices, wherein analyzing further comprises: determining, using a trained machine learning model, a likelihood that a first subset of the log data is associated with operational failure of one or more component-level functions; determining that the likelihood that the first subset of the log data is associated with the operational failure of one or more component-level functions is greater than a predetermined threshold; determine that the first subset of the log data reflects a current state of a first subset of source devices; generate a notification indicating that the first subset of source devices is likely to experience the operational failure of one or more component-level functions; and transmit control signals configured to cause an administrator device associated with the first subset of source devices to display the notification.

In yet another aspect, a method for early detection of operational failure in component-level functions within a computing environment is presented. The method comprising: electronically receiving, from one or more source devices, log data; analyzing, using a machine learning subsystem, the log data for indications of operational failure of one or more component-level functions associated with the one or more source devices, wherein analyzing further comprises: determining, using a trained machine learning model, a likelihood that a first subset of the log data is associated with operational failure of one or more component-level functions; determining that the likelihood that the first subset of the log data is associated with the operational failure of one or more component-level functions is greater than a predetermined threshold; determining that the first subset of the log data reflects a current state of a first subset of source devices; generating a notification indicating that the first subset of source devices is likely to experience the operational failure of one or more component-level functions; and transmitting control signals configured to cause an administrator device associated with the first subset of source devices to display the notification.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Application performance management (APM) is the monitoring and management of performance and availability of devices and applications by diagnosing complex application performance problems to maintain an expected level of service. Operational elements of a computing environment are becoming increasingly difficult to manage as they move toward highly distributed, multi-tier, multi-element constructs. Any operational failure detection and mitigation in services, processes, hosts, logs, networks, and/or the like often involves manual intervention which can become a tedious process. Therefore, there is a need for an intelligent system for early detection of operational failure in component-level functions within a computing environment.

Figure 1:
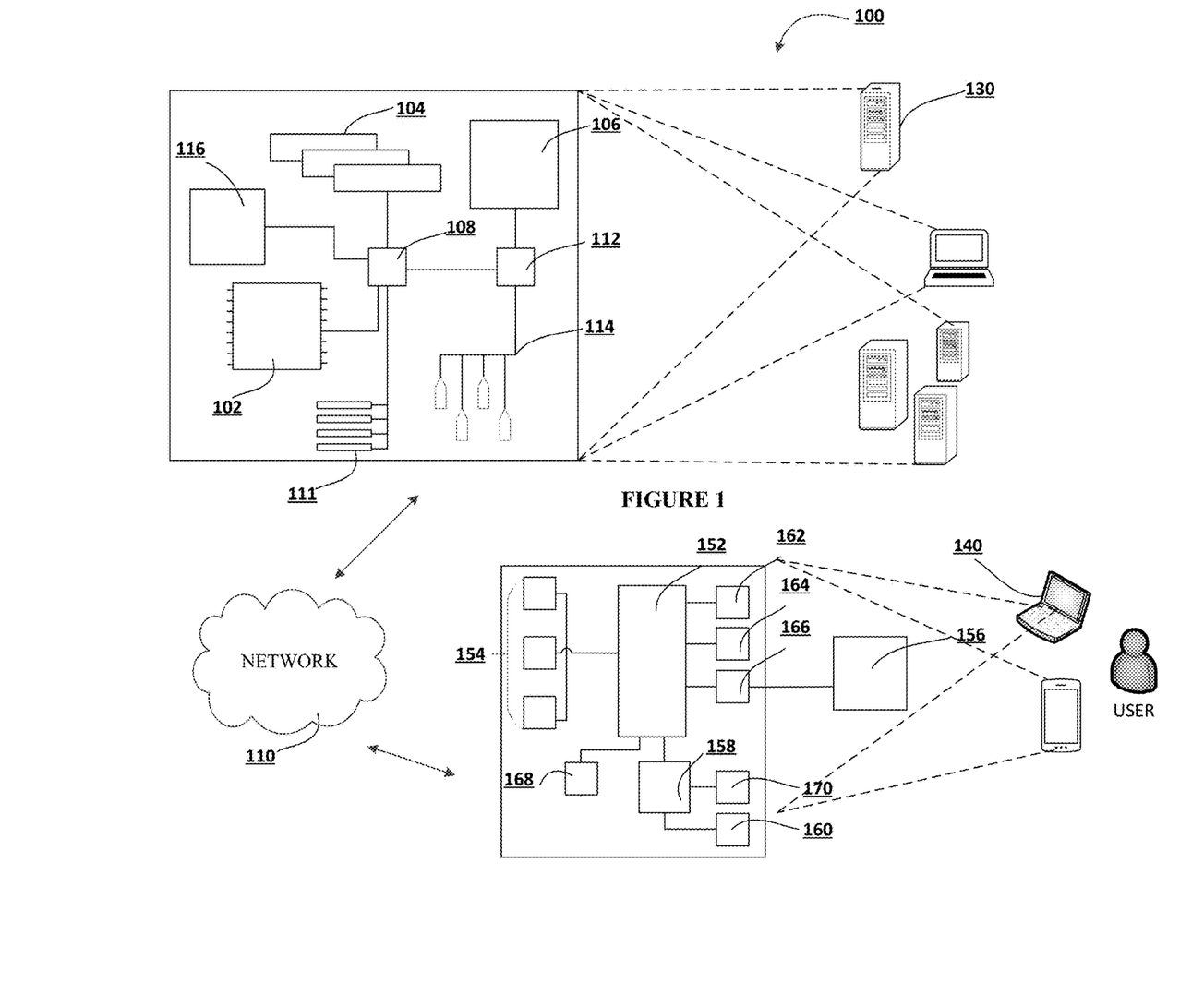
FIG. 1 illustrates technical components of an exemplary distributed computing environment for early detection of operational failure in component-level functions within a computing environment, in accordance with an embodiment of the invention.

FIG. 1 illustrates technical components of an exemplary distributed computing environment for early detection of operational failure in component-level functions within a computing environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the distributed computing environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices, blade servers, mainframes, or any combination of the aforementioned. In accordance with embodiments of the invention, the user input device 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. The processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, including instructions stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein. Also, multiple systems, same or similar to system 130 may be connected, with each system providing portions of the necessary operations (e.g., as a server bank, a group of blade servers, or a multi-processor system). In some embodiments, the system 130 may be managed by the entity. The system 130 may be located at the facility associated with the entity or remotely from the facility associated with the entity.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154, which in one embodiment includes the instructions of an application that may perform the functions disclosed herein. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiment of the invention, the components of the distributed computing environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the distributed computing environment 100 illustrated in FIG. 1 is exemplary and that other embodiments may vary. As another example, in some embodiments, the distributed computing environment may include more, fewer, or different components. As another example, in some embodiments, some or all of the portions of the distributed computing environment 100 may be combined into a single portion. Likewise, in some embodiments, some, or all of the portions of the system 130 may be separated into two or more distinct portions.

Figure 2:
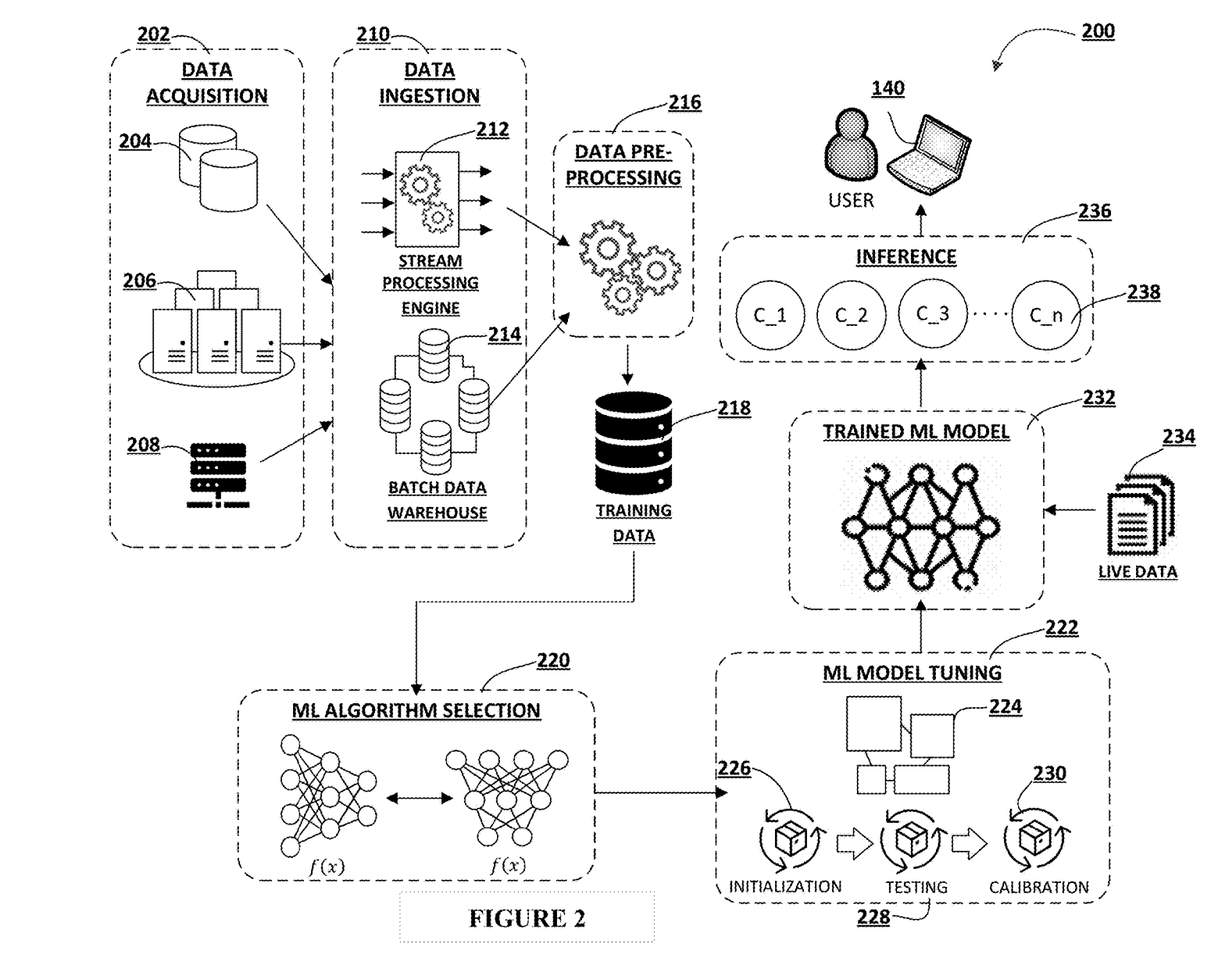
FIG. 2 illustrates an exemplary machine learning subsystem architecture, in accordance with an embodiment of the invention.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/ or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

Figure 3:
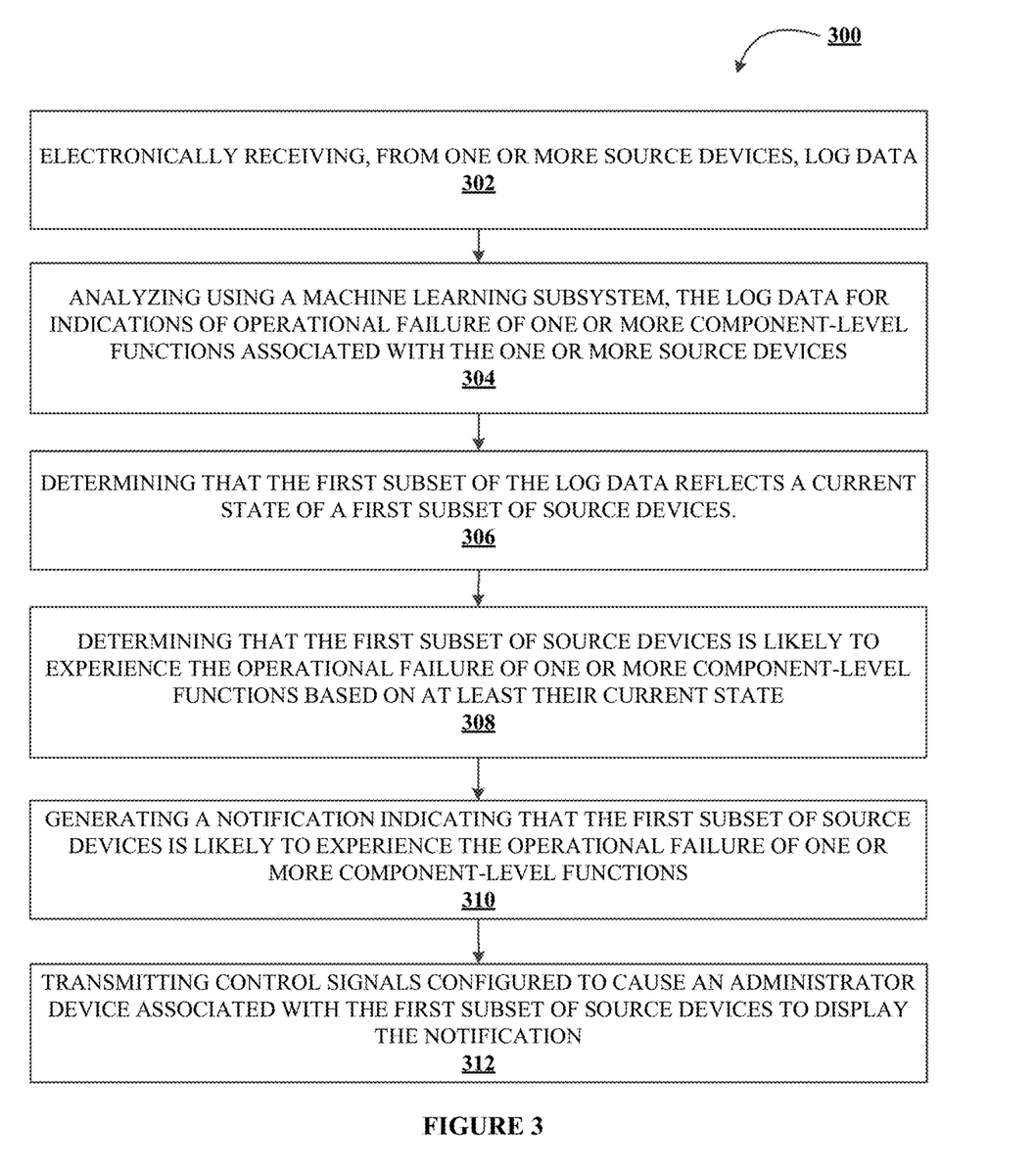
FIG. 3 illustrates a process flow for early detection of operational failure in component-level functions within a computing environment, in accordance with an embodiment of the invention.

FIG. 3 illustrates a process flow for early detection of operational failure in component-level functions within a computing environment 300, in accordance with an embodiment of the invention. As shown in block 302, the process flow includes electronically receiving, from one or more source devices, log data. Log data records and tracks all interactions through which data, files or applications are stored, accessed, or modified on a storage device or application across a distributed computing environment such as a technology infrastructure of an entity. By collecting and storing log data over a period of time, entities can use log data to analyze specific trends or record the data-based events/actions of a device, system, or network, collectively referred to herein as "source devices." In some embodiments, each source device may be associated with one or more independent hardware and/or software components that operate synchronously to execute component-level functions. Log data may be generated by continuously monitoring component-level functions of various hardware and/or software components of each source device. Log data may include measurable properties or characteristics of each hardware and/or software component that reflects everything and anything that happens within source device, including events such as transactions, errors, and intrusions. In one example, log data may reflect a processor performance, memory utilization of a source device over time, network bandwidth usage, and/or the like. Therefore, by continuously monitoring the component-level functions of a source device, the system may be configured to determine a current state of the source device, its configuration, and operational status at any time instant.

Next, as shown in block 304, the process flow includes analyzing using a machine learning subsystem, the log data for indications of operational failure of one or more component-level functions associated with the one or more source devices. In this regard, the machine learning subsystem may be configured to determine, using a trained machine learning model, a likelihood that a first subset of the log data is associated with operational failure of one or more component-level functions. As described herein, the machine learning model may refer to a mathematical model generated by machine learning algorithms based on training data, to make predictions or decisions without being explicitly programmed to do so. In some embodiments, the machine learning subsystem may be configured to train the machine learning model using the log data and map specific log data patterns to operational failure of one or more component-level functions. Once trained, the machine learning subsystem may be configured to determine model parameters for the trained machine learning model that are then used on unseen (or live) log data to recognize patterns or indications of similar operational failure of one or more component-level functions.

To generate the training dataset, the machine learning subsystem may be configured to continuously monitor incidences of historical component-level functional failures associated with the one or more source devices. In response, the machine learning subsystem may be configured to retrieve historical log data corresponding to the historical component-level functional failures and map specific log data patterns that correspond to the historical component-level functional failures. In some embodiments, the log data patterns from the historical log data may reflect a state of the one or more source devices a predetermined period of time prior to the incidences of the historical component-level functional failures. In this way, the present invention provides the functional benefit of training for and recognizing patterns of operational failure of one or more component-level functions prior to their incidence. In response, the system may be configured to store the historical log data and the corresponding historical component-level functional failures in a second internal repository. This historical log data and the corresponding historical component-level functional failures form the training dataset for the machine learning model.

In some embodiments, the machine learning subsystem may be configured to determine, using the trained machine learning model, a similarity between the patterns identified in the log data with pre-recorded patterns made by operational failure of one or more component-level functions. Based on this similarity, the machine learning subsystem may be configured to determine the likelihood that the patterns identified in the first subset of the log data is associated with operational failure of one or more component-level functions. This likelihood is continuously compared to a predetermined threshold to determine a severity of the condition.

Next, as shown in block 306, the process flow includes determining that the first subset of the log data reflects a current state of a first subset of source devices. In some embodiments, the system may be configured to determine specific hardware and/or software components of the first subset of source devices, whose current state was reflected in the first subset of the log data. Next, as shown in block 308, the process flow includes determining that the first subset of source devices is likely to experience the operational failure of one or more component-level functions based on at least their current state. If the likelihood that the patterns identified in the first subset of the log data is associated with operational failure of one or more component-level functions is greater than the predetermined threshold, the system may be configured to determine that the specific hardware and/or software components of the first subset of source devices are likely to experience the operational failure of one or more component-level functions.

Next, as shown in block 310, the process flow includes generating a notification indicating that the first subset of source devices is likely to experience the operational failure of one or more component-level functions. Next, as shown in block 312, the process flow includes transmitting control signals configured to cause an administrator device associated with the first subset of source devices to display the notification.

In some embodiments, the operational failure of one or more component-level functions may be tiered based on their impact to the overall computing environment. Each tier may be associated with a set of mitigation actions to be executed in response to the operational failure of one or more component-level functions in that tier. Accordingly, based on the specific tier, the system may be configured to retrieve, from a first internal repository, mitigation actions associated with the operational failure of one or more component-level functions. In one aspect, the mitigation actions may be preventative actions that are to be implemented before the first subset of source devices experience the operational failure of one or more component-level functions. In another aspect, the mitigation actions are remedial actions that are to be implemented after the first subset of source devices experience the operational failure of one or more component-level functions. In response, the system may be configured to transmit control signals configured to cause the administrator device to display the one or more mitigation actions.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for early detection of operational failure in component-level functions within a computing environment, the system comprising:
   at least one non-transitory storage device; and
   at least one processor coupled to the at least one non-transitory storage device, wherein the at least one processor is configured to:
   electronically receive, from one or more source devices, log data;
   analyze, using a machine learning subsystem, the log data for indications of operational failure of one or more component-level functions associated with the one or more source devices, wherein analyzing further comprises:
      determining, using a trained machine learning model, a likelihood that a first subset of the log data is associated with operational failure of one or more component-level functions;
      determine that the first subset of the log data reflects a current state of a first subset of source devices;
      determine that the first subset of source devices is likely to experience the operational failure of one or more component-level functions based on at least a respective current state associated with each first subset of source devices;
      determine a tier of the operational failure of the one or more component-level functions based on an overall effect of the operation failure on the computing environment; and
      generate a notification indicating that the first subset of source devices is likely to experience the operational failure of one or more component-level functions and the tier of the operational failure of the one or more component-level functions.

2. The system of claim 1, wherein the at least one processor is further configured to:
- retrieve, from a first internal repository, one or more mitigation actions associated with the tier of the operational failure of one or more component-level functions; and
- transmit control signals configured to cause an administrator device to display the one or more mitigation actions.

3. The system of claim 2, wherein the one or more mitigation actions are preventative actions that are to be implemented before the first subset of source devices experience the operational failure of one or more component-level functions.

4. The system of claim 2, wherein the one or more mitigation actions are remedial actions that are to be implemented after the first subset of source devices experience the operational failure of one or more component-level functions.

5. The system of claim 1, wherein the at least one processor is further configured to:
- continuously monitor component-level functions of one or more source devices within the computing environment;
- determine a current state of the one or more source devices based on at least monitoring the component-level functions of the one or more source devices; and
- electronically receive, from one or more source devices, the log data reflecting the current state of the one or more source devices.

6. The system of claim 1, wherein the at least one processor is further configured to:
- continuously monitor incidences of historical component-level functional failures associated with the one or more source devices;
- retrieve historical log data corresponding to the historical component-level functional failures, wherein the historical log data reflects a state of the one or more source devices a predetermined period of time prior to the incidences of the historical component-level functional failures; and
- store the historical log data and the corresponding historical component-level functional failures in a second internal repository.

7. The system of claim 6, wherein the at least one processor is further configured to:
- retrieve, from the second internal repository, the historical log data and the corresponding historical component-level functional failures; and
- generate a training dataset using the historical log data and the corresponding historical component-level functional failures.

8. The system of claim 7, wherein the at least one processor is further configured to:
- train a machine learning model with the training dataset using a machine learning algorithm; and
- generate the trained machine learning model.

9. A computer program product for early detection of operational failure in component-level functions within a computing environment, the computer program product comprising a non-transitory computer-readable medium comprising code causing a first apparatus to:
- electronically receive, from one or more source devices, log data;
- analyze, using a machine learning subsystem, the log data for indications of operational failure of one or more component-level functions associated with the one or more source devices, wherein analyzing further comprises:
  - determining, using a trained machine learning model, a likelihood that a first subset of the log data is associated with operational failure of one or more component-level functions;
- determine that the first subset of the log data reflects a current state of a first subset of source devices;
- determine that the first subset of source devices is likely to experience the operational failure of one or more component-level functions based on at least a respective current state associated with each first subset of source devices;
- determine a tier of the operational failure of the one or more component-level functions based on an overall effect of the operation failure on the computing environment; and
- generate a notification indicating that the first subset of source devices is likely to experience the operational failure of one or more component-level functions and the tier of the operational failure of the one or more component-level functions.

10. The computer program product of claim 9, wherein the first apparatus is further configured to:
- retrieve, from a first internal repository, one or more mitigation actions associated with the tier of the operational failure of one or more component-level functions; and
- transmit control signals configured to cause an administrator device to display the one or more mitigation actions.

11. The computer program product of claim 10, wherein the one or more mitigation actions are preventative actions that are to be implemented before the first subset of source devices experience the operational failure of one or more component-level functions.

12. The computer program product of claim 10, wherein the one or more mitigation actions are remedial actions that are to be implemented after the first subset of source devices experience the operational failure of one or more component-level functions.

13. The computer program product of claim 9, wherein the first apparatus is further configured to:
- continuously monitor component-level functions of one or more source devices within the computing environment;
- determine a current state of the one or more source devices based on at least monitoring the component-level functions of the one or more source devices; and
- electronically receive, from one or more source devices, the log data reflecting the current state of the one or more source devices.

14. The computer program product of claim 9, wherein the first apparatus is further configured to:
- continuously monitor incidences of historical component-level functional failures associated with the one or more source devices;
- retrieve historical log data corresponding to the historical component-level functional failures, wherein the historical log data reflects a state of the one or more source devices a predetermined period of time prior to the incidences of the historical component-level functional failures; and
- store the historical log data and the corresponding historical component-level functional failures in a second internal repository.

15. The computer program product of claim 14, wherein the first apparatus is further configured to:
- retrieve, from the second internal repository, the historical log data and the corresponding historical component-level functional failures; and
- generate a training dataset using the historical log data and the corresponding historical component-level functional failures.

16. The computer program product of claim 15, wherein the first apparatus is further configured to:
- train a machine learning model with the training dataset using a machine learning algorithm; and
- generate the trained machine learning model.

17. A method for early detection of operational failure in component-level functions within a computing environment, the method comprising:
- electronically receiving, from one or more source devices, log data;
- analyzing, using a machine learning subsystem, the log data for indications of operational failure of one or more component-level functions associated with the one or more source devices, wherein analyzing further comprises:
  - determining, using a trained machine learning model, a likelihood that a first subset of the log data is associated with operational failure of one or more component-level functions;
- determining that the first subset of the log data reflects a current state of a first subset of source devices;
- determining that the first subset of source devices is likely to experience the operational failure of one or more component-level functions based on at least a respective current state associated with each first subset of source devices;
- determining a tier of the operational failure of the one or more component-level functions based on an overall effect of the operation failure on the computing environment; and
- generating a notification indicating that the first subset of source devices is likely to experience the operational failure of one or more component-level functions and the tier of the operational failure of the one or more component-level functions.

18. The method of claim 17, wherein the method further comprises:
- retrieving, from a first internal repository, one or more mitigation actions associated with the tier of the operational failure of one or more component-level functions; and
- transmitting control signals configured to cause an administrator device to display the one or more mitigation actions.

19. The method of claim 18, wherein the one or more mitigation actions are preventative actions that are to be implemented before the first subset of source devices experience the operational failure of one or more component-level functions.

20. The method of claim 18, wherein the one or more mitigation actions are remedial actions that are to be implemented after the first subset of source devices experience the operational failure of one or more component-level functions.

* * * * *